United States Patent Office 3,136,428
Patented June 9, 1964

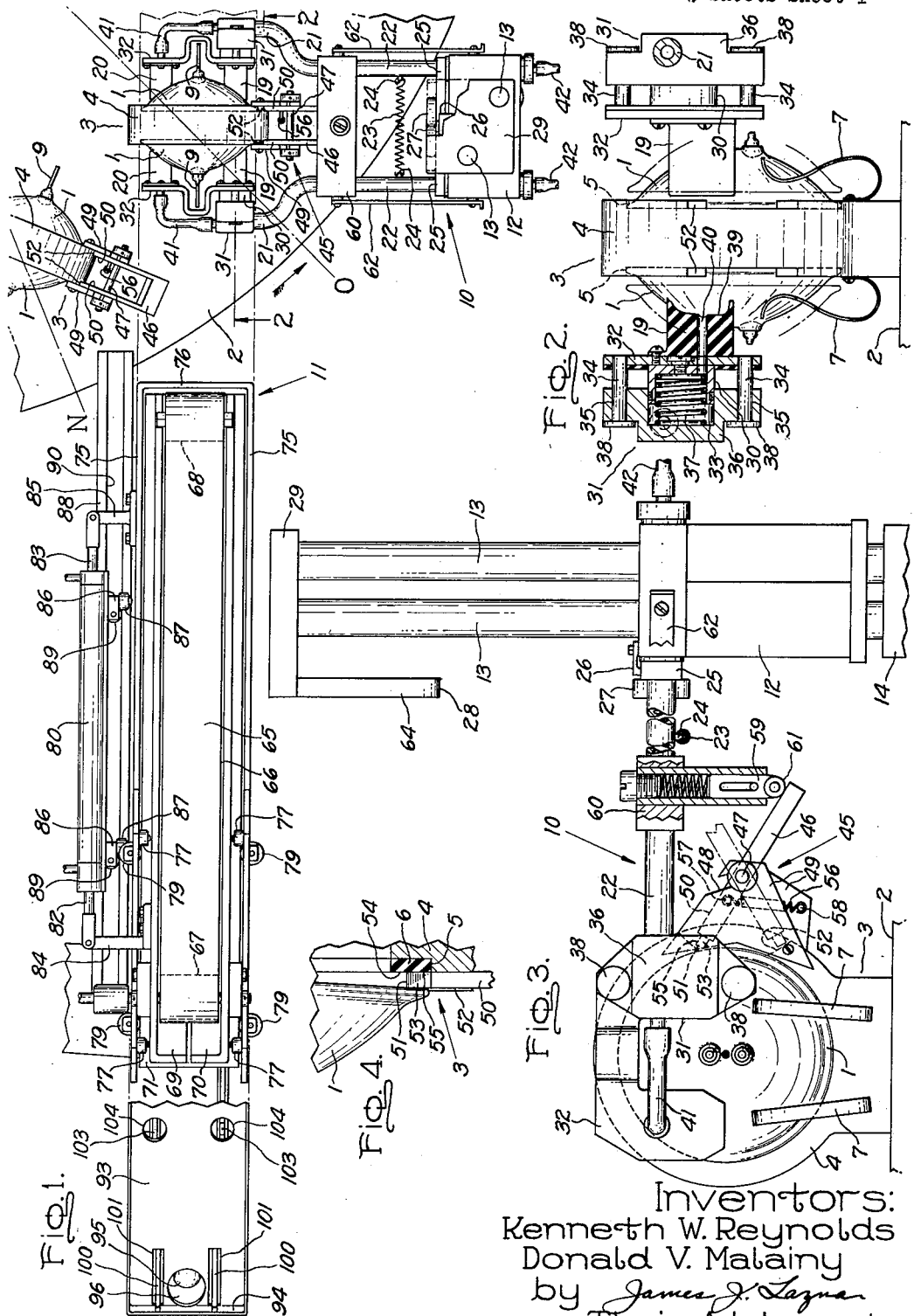

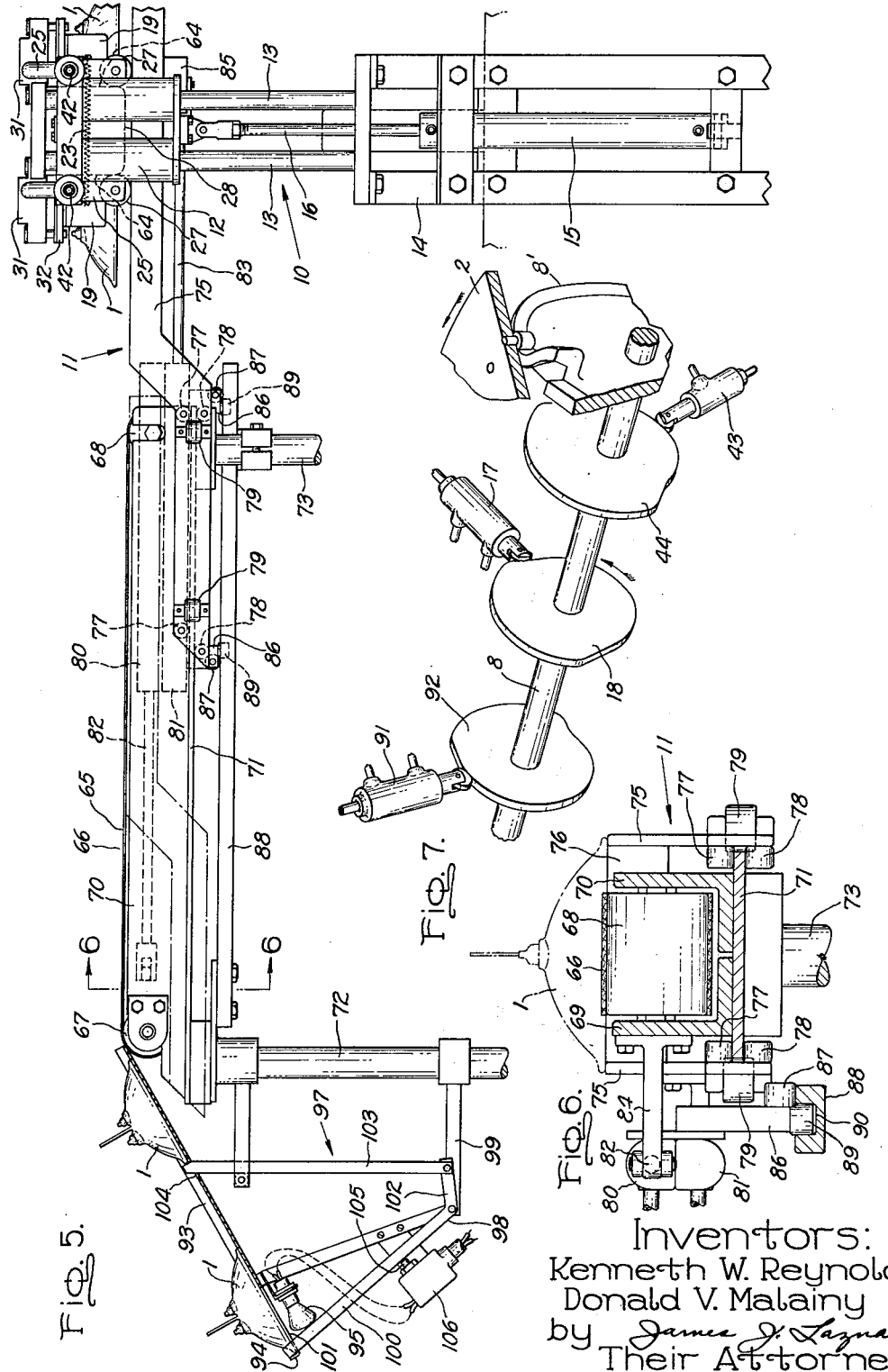

3,136,428
ARTICLE UNLOADING APPARATUS
Kenneth W. Reynolds, Willoughby, and Donald V. Malainy, Mentor, Ohio, assignors to General Electric Company, a corporation of New York
Filed Apr. 25, 1961, Ser. No. 121,797
10 Claims. (Cl. 214—1)

This invention relates in general to unloading apparatus for automatically unloading articles from the article-carrying work heads of a processing machine, and more particularly to apparatus for unloading cup-shaped articles from work heads arranged to hold a pair of such cup-shaped articles in opposed relation with their concave sides facing one another.

One of the operations in the manufacture of certain reflector type incandescent lamps such as, for example, the well known all-glass sealed beam headlamps employing bulbs or envelopes consisting of pressed glass reflector and cover glass sections sealed together at their peripheries by fusion, is the application of a metallic reflecting coating to the concave inner side of the reflector section. The most commonly employed method of applying such a metallic reflector coating onto the cup-shaped glass section is by the use of a metallic vapor deposition process wherein a suitable metallic reflecting material such as aluminum is evaporated and condensed, in an evacuated space, onto the concave interior surface of the cup-shaped glass section. For such purpose, reflector coating machines such as that disclosed in U.S. Patent 2,304,859, Strickland et al., are commonly employed, such machines comprising in generally an indexing carrier such as a horizontal turret provided around its periphery with a plurality of work heads each in the form of an annular or drum-shaped body portion adapted to receive and hold a pair of the glass cups in opposed relation seated within wells in the head, with the concave inner sides of the glass cups facing horizontally toward one another. The heads are each provided with a vacuum connection for evacuating the closed space formed by the annular body portion of the head and the two glass cups seated thereagainst. In addition, each head is provided with a pair of tungsten heater coils located more or less centrally within but spaced apart along the axis of the annular interior space of the body portion of the head, within or on which heater coils a small body of the metallic coating material to be deposited, such as a thin strip of aluminum, is placed and, after evacuation of the head, is then heated and vaporized by passage of an electric current through the heater coils, the vaporized aluminum then condensing on the concave inside surfaces of the glass cups to form a reflective coating thereon.

Heretofore, the loading of the glass cups into, and their subsequent removal from the heads of such type reflector coating machines, together with the necessity for applying vaporizable metallic elements to the heater coils of each head for each cycle of operation thereof, has required the services of two operators, at present existing machine speeds. By eliminating one or more of these manual operations, a reduction in the number of operators required for such type reflector coating machines can be achieved without any accompanying reduction in machine speed.

It is an object of our invention, therefore, to provide apparatus for automatically unloading cup-shaped articles from an article-carrying work head of a processing machine.

Another object of our invention is to provide apparatus for automatically unloading cup-shaped articles from an article-carrying work head adapted to hold a pair of such cup-shaped articles in opposed relation with their concave sides facing one another.

Still another object of our invention is to provide apparatus for automatically unloading pairs of cup-shaped articles from successive article-carrying work heads of a processing machine, each head of which is adapted to hold a pair of such articles in opposed relation with their concave faces directed horizontally toward one another, and successively delivering the articles in face down position to an article inspection station.

Briefly stated, in accordance with the invention, an unloading apparatus for an article processing machine having article-carrying heads each adapted to support a pair of cup-shaped articles in opposed relation with their concave sides facing horizontally toward one another, is comprised of an article elevator mechanism mounted for vertical reciprocating movement and carrying suction cup means pivotally mounted thereon for grasping the articles in the head at the lowered position of the elevator mechanism and then pivoting away from each other during the subsequent upward stroke of the elevator mechanism to thereby swing the articles to, and release them in a concave face down position, at the raised position of the elevator mechanism, onto a conveyor means arranged to then transport the articles successively away from beneath the raised suction cups of the elevator mechanism. According to a further aspect of the invention, the unloading mechanism is provided with means for prying the cup-shaped articles loose from the article-carrying heads of the processing machine in order to assure positive pick-up and withdrawal of the articles from the head by the suction cup means. In addition, the unloading mechanism is arranged to grasp and move the pair of articles in the head oppositely away from one another, during the dwell of the elevator mechanism in its lowered position, to first withdraw the articles from wells in the head so as to be clear thereof during the subsequent upward movement of the elevator mechanism and the articles carried thereby.

Further objects and advantages of our invention will appear from the following detailed description of a species thereof and from the accompanying drawings.

In the drawings, FIG. 1 is a plan view of article unloading apparatus comprising our invention and including a fragmentary view of an associated article processing machine.

FIG. 2 is a vertical section on the line 2—2 of FIG. 1.

FIG. 3 is a side elevation, partly in section, of the elevator portion of the unloading mechanism comprising our invention and showing an associated article-carrying head of the processing machine.

FIG. 4 is a fragmentary sectional view of one of the article-carrying heads of the machine showing the associated means for prying the article loose from the seat therefor in the head.

FIG. 5 is a front elevation of the unloading mechanism comprising our invention.

FIG. 6 is a vertical section on the line 6—6 of FIG. 5, and

FIG. 7 is a perspective view of the cam shaft and associated control means for effecting the operation of the unloading apparatus in proper time relation to the operation of the processing machine.

Referring to the drawings, the invention is therein illustrated as embodied in apparatus for automatically unloading cup-shaped articles 1 such as, for example, the generally parabolically dished pressed glass reflector sections employed as a part of the envelope or bulb for the well-known all glass sealed beam headlamp, from a conventional type reflector coating machine such as is commonly employed to apply the metallic reflector coating to the concave inner side of the cupped glass sections.

Such reflector coating machines are of the general form disclosed in the aforesaid U.S. Patent 2,304,859, Strickland et al. and comprise, in general, an indexing carrier in the form of a rotatably mounted horizontal turret 2 provided around its periphery with a plurality of spaced article-carrying work heads 3 each comprising an annular or drum-shaped body portion 4 mounted in an upright position on the upper side of the turret 2 with its axis extending horizontally at an angle of, for example, 45° or so to the radial line of the turret through the head. As shown, each of the heads 3 is adapted to receive and hold a pair of the glass reflector sections 1 in opposed face-to-face relation with their concave inner sides facing horizontally toward one another. For such purpose, the ring or drum-shaped body portion 4 of each head 3 is provided with wells or internal annular shoulders 5 in its opposite end faces within which the rims of the reflector sections 1 are received and seat tight against rubber or similar type sealing gaskets 6 (FIG. 4) within the wells so as to provide a vacuum-tight seal between the reflector sections and the hollow interior of the body portion 4 of the head. The reflector sections 1 are yieldingly held in place in the heads 3, with their rims seated against the rubber sealing gaskets 6, by means of respective pairs of S-shaped cantilever type leaf springs 7 (FIG. 2) which are anchored at one end to respective sides of the head 3, at regions beneath the reflector-receiving opening therein, so as to extend upwardly part way thereacross and engage the back sides of the reflector sections 1 when properly seated in the heads. The carrier or rotatable turret 2 is intermittently indexed in step-by-step fashion in a counterclockwise direction to advance each of the heads 3 successively to, and position them at, a plurality of stations including an unloading station O where the coated reflector sections 1 are removed from the heads 3 by the apparatus comprising our invention. The indexing movement of the turret 2 may be imparted thereto by any conventional type indexing means such as, for example, the barrel cam and cam follower roller type shown in U.S. Patent 2,730,068, Reynolds et al. and actuated by an electric motor driven cam shaft 8 (FIG. 7) on which the barrel cam 8' is fixedly mounted.

In the general operation of the reflector coating machine, small pieces or strips of aluminum or other suitable vaporizable metallic reflecting material are first placed on tungsten heater coils (not shown) located within the drum-shaped body portion 4 of each head, after which a pair of the glass reflector sections 1 are then loaded into the head, their exhaust tubes 9 closed off by suitable stopper means, and the head 3 then carried through each of the successive work stations of the machine where the hollow interior of the head is first evacuated and the heater coils then energized, by the passage of electric current therethrough, to heat and vaporize the aluminum strips on the coils, the vaporized aluminum particles then condensing on the relatively cool inside surfaces of the glass reflector sections 1 to form the reflective coating thereon. For a more complete description and understanding of the general operation of the reflector coating machine, reference may be had to the aforementioned Strickland et al. patent.

The unloading apparatus according to our invention comprises a reflector elevator means 10 mounted at the unloading station O of the reflector coating machine for vertical reciprocating movement between a lowered position for pick-up of the reflectors 1 in and withdrawal from the head 3 at said station O, and a raised position for release of the reflectors 1 onto a horizontally reciprocable carriage means 11. The elevator means 10 comprises a carrier slide 12 mounted for vertical sliding movement on supporting guide means in the form of a pair of vertical support posts or guide rods 13 which are fixedly mounted on a stationary part 14 of the machine frame and are located outwardly adjacent the periphery of the turret 2 and generally symmetrical about the vertical plane of the drum-shaped body portion 4 of the heads 3 when located at the unloading station O, as shown in FIG. 1. Vertical reciprocating movement of the carrier slide 12 on the support posts or guide rods 13 is imparted thereto by an air cylinder 15 (FIG. 5) which is mounted on the supporting framework 14 of the elevator mechanism and the piston rod 16 of which is connected to the carrier slide 12. The operation of the air cylinder 15 is controlled by a valve 17 (FIG. 7) connected in the air supply line for the cylinder. The valve 17 is actuated by a cam 18 on cam shaft 8, and is adapted to control the supply of air to the air cylinder 15 so as to cause the vertical movement of the carrier slide 12 to occur in proper time relation to the index movements and dwell periods of the turret 2.

Mounted on and carried by the carrier slide 12 are two cooperating sets of reflector section holder or pick-up means in the form of rubber suction cups 19 and 20, one set of suction cups 19, 20 for each of the two reflectors 1 in the head 3 at station O. The reflector holders or suction cup sets 19 and 20 are contoured to engage with and grasp the curved upper back sides of the reflector sections 1 in the head 3, and they are rotatably mounted on the carrier slide 12 for rotational or pivotal movement in vertical planes parallel to the vertical axial plane of the drum-shaped body portion 4 of the heads 3 when positioned at station O. For such purpose, the reflector holders or suction cup sets 19 and 20 are mounted on projecting offset end or crank arm portions 21 of a pair of horizontally extending parallel hollow pivot shafts 22 which are journaled in the carrier slide 12 to rotate about parallel horizontal axes extending normal to the vertical axial plane of the drum-shaped body portion 4 of the head 3 when positioned at station O, and disposed in spaced relation on opposite sides of and equidistant from the vertical plane of the drum-shaped body portion 4 of the head 3 at station O. As shown in FIG. 1, the offset end or crank arm portions 21 of the pivot shafts 22 project from the carrier slide 12 in directions such as to straddle the reflector-carrying sides of the head 3 at station O and the reflectors 1 held therein, when the elevator mechanism 10 is in its lowered position. The pivot shafts 22 and associated suction cups 19, 20 are continuously urged to and, during the lower portion of the vertical movement of the elevator mechanism 10, are maintained in a limiting inward rotative position, in which the reflector-engaging or pick-up surfaces of the suction cups are disposed in opposed facing relation (FIG. 2) in readiness for pick-up of the reflectors in the head 3, by a tension coil spring 23 connected at its opposite ends to spring posts 24 extending from the pivot shafts 22. The said limiting inward rotative position of the suction cups 19, 20 is determined by the engagement of lever arms 25 on the pivot shafts 22 with a stop 26 fastened to and extending from the carrier slide 12. In such limiting inward rotative position of the pivot shafts 22 and suction cups 19, 20, the projecting crank arm end portions 21 of the shafts 22 are offset horizontally away from one another, as shown in FIG. 1. During the upper portion of the upward stroke of the elevator mechanism 10, the shafts 20 are pivoted to swing the two sets of suction cups 19, 20 and reflector sections 1 held therein outwardly away from one another and downwardly to a limiting outward rotative or face-down position, with the concave sides of the reflector sections 1 facing downwardly as shown in FIG. 5, by the engagement of rollers 27 on the ends of the lever arms 25 with a cooperating stationary plate cam 28 fastened to and depending from a top plate 29 secured to the upper ends of the upright support guide posts 13. The pivot shafts 22 and associated suction cups 19, 20, together with the reflector sections 1 held therein, are maintained in the said limiting outward rotative position at the raised or uppermost position of the elevator mechanism 10 by the continued engagement of the plate cam 28 with the rollers 27 on the lever arms 25.

As shown more particularly in FIG. 2, each pivot shaft 22 carries a set of the suction cups 19, 20, and the two suction cups of each set are mounted on and carried by a spring-loaded piston 30 of a vacuum operated air cylinder 31 fixedly secured to the projecting offset end portion 21 of the respective pivot shaft 22. To this end, each suction cup set 19,20 is secured to a common support or holder plate 32 to one end of which is fastened the piston 30 and suction cup 19, the other suction cup 20 being fastened to the other or free end of the support plate 32. The integrally united piston 30 and suction cup support plate 32, and the associated set of suction cups 19, 20 carried thereby, are locked in proper oriented position, against rotation about the axis of the cylindrical piston chamber 33 of the air cylinder 31, by means of a pair of guide pins 34 fastened to the support plate 32 and slidably fitting within and extending through cooperating guide openings 35 in the body portion 36 of the air cylinder 31. The piston 30 is continuously urged to its extended or "out" position to locate the associated suction cups 19,20 in their advanced position as shown in FIG. 2, in readiness for pick-up of the reflector sections 1 in the head 3, by a compression coil spring 37 located within the chamber 33 of the air cylinder 31 and compressed between the piston 30 and the closed end of the chamber 33. The "out" or advanced position of the suction cups 19, 20, under the influence of the coil spring 37, is determined by the engagement of head portions 38 on the guide pins 34 with the body portion 36 of the air cylinder 31.

In their said advanced or reflector section pick-up position, the cupped or reflector-engaging outer ends 39 of the suction cups 19, 20 are located immediately adjacent and sufficiently close to the convexly curved back sides of the reflector sections 1 in the head 3, when the elevator mechanism 10 is located in its lowered position, to cause the reflector sections 1 to be drawn out of the wells 5 in the head 3 and tight against the cupped ends 39 of the suction cups 19, 20 by the pull of the vacuum present in the suction cups at such lowered position of the elevator means. The suction cups 19, 20 are connected to the source of vacuum from the time the elevator mechanism 10 is first positioned in its lowered position until after it has been elevated to its raised position and the horizontal carriage means 11 has moved to its extended position underlying the reflector sections 1 held in the suction cups 19, 20 of the raised elevator means. The connection of the suction cups 19, 20 to the vacuum source is made through the chamber 33 of the air cylinder 31 which communicates with the cupped end 39 of suction cup 19 through a passageway 40 (FIG. 2) extending through both the suction cup and the support plate 32 therefor. The cupped end 39 of suction cup 20 is connected to the chamber 33 of the air cylinder 31 by a similar passageway (not shown) extending through the suction cup 20 and support plate 32 and a connecting flexible conduit 41 such as a length of rubber tubing. The chamber 33 of the air cylinder 31 is connected to the source of vacuum through the hollow interior of the pivot shafts 22 which are made of tubing and open at one end into the chamber, the other end being connected by rubber tubing 42 to the vacuum source through a control valve 43 (FIG. 7). The valve 43 is actuated by a cam 44 on the cam shaft 8 in proper time relation to the index movements of the turret 2 and the vertical reciprocating movement of the elevator mechanism 10. In one of its two operating positions, the control valve 43 connects the chamber 33 and the suction cups 19, 20 to the vacuum source to cause them to grasp and hold the reflector sections 1, while in its other operative position the valve 43 vents the chamber 33 and the suction cups 19, 20 to the atmosphere to cause them to release their grip on the reflector sections 1.

In some cases the reflector sections 1, by reason of their being drawn tight against the sealing gaskets 6 of the heads 3 by the vacuum produced therein during the reflector coating operation, tend to stick to the sealing gaskets to a degree such that the vacuum pull in the suction cups 19, 20 is ineffective to pull the reflector sections 1 away from the sealing gaskets and against the suction cups 19, 20 so as to be held thereby. Accordingly, to assure positive pick-up in every case of the reflector sections 1 in the head 3 and their withdrawal therefrom by the vacuum pull of the suction cups 19, 20 when the elevator mechanism 10 is in its lowered positon, reflector loosening means 45 are provided for freeing or loosening the reflector sections 1 from the sealing gaskets 6 in the heads 3 immediately prior to the arrival of the elevator mechanism 10 and associated suction cups 19, 20 at their lowered position in readiness for pick-up of the reflector sections 1 in the heads 3. The reflector loosening means 45 comprises a generally horizontally extending U-shaped double-armed reflector engaging lever 46 on each head 3 pivotally mounted thereon outwardly adjacent the periphery of the drum-shaped body portion 4 of the head to swing in a vertical plane aligned with the vertical plane of the drum-shaped body portion 4 of the head. The lever 46 is pivotally mounted intermediate its ends by means of a pivot shaft 47 received in bearing slots 48 in a pair of support bracket plates 49 which are fastened to the opposite sides of the drum-shaped body portion 4 of the head 3. The two inner arm portions 50 of the lever 46 are provided with wedge-shaped reflector engaging inner ends 51 (FIG. 4) which extend into and are adapted to swing within notched or recessed portions 52 of the rims of the heads 3. The wedge surfaces 53 of the wedge ends 51 of the lever arm portions 50 face upwardly and slope toward the seating plane 54 of the reflector sealing gaskets 6 in the head 3, and they terminate in top or leading edges 55 which are disposed parallel to and, on pivotal movement of the lever 46 in a direction to cause its inner arm portions 50 to swing upwardly, wipe across the seating surfaces 54 of the respective sealing gaskets 6 in the head 3 so as to engage between the rims of the respective reflector sections 1 and the sealing gaskets 6 to pry the reflector sections loose and separate them a slight distance from the sealing gaskets, as shown in FIG. 4, against the force of the reflector holding springs 7. For this purpose, the facing inward sides of the two inner arm portions 50 of the lever 46 are approximately aligned with the plane of the reflector seating surfaces 54 of the respective sealing gaskets 6 in the head 3 so as to just clear or wipe the said seating surfaces 54 during the pivotal movement of the lever 46.

The lever 46 is normally urged to and held in its retracted pivotal position, with its inner or wedge ends 51 located in their "down" position within the lower region of the notches 52 in the head 3, as shown in dash-dot lines in FIG. 3, by the pull of a tension coil spring 56 connected at its opposite ends to spring posts 57, 58 on the lever 46 and one of the support bracket plates 49, respectively. The pivotal movement of the lever 46 to operate it so as to pry the reflector sections 1 loose from the sealing gaskets 6 in the head 3 is imparted to the lever by the engagement of the elevator mechanism 10 with the outer arm or end portion of the lever 46 on the downward movement of the elevator mechanism to its lowered position. For this purpose, the elevator mechanism 10 is provided with a spring-loaded striker pin 59 which is mounted on a cross arm 60 carried by and bridging the pivot shafts 22 of the elevator mechanism, and is provided at its lower end with a roller 61 which engages with the outer end of the lever 46, during the very last portion of the downward stroke of the elevator mechanism 10, to pivotally operate and swing the lever 46 to its advanced position as shown in full lines in FIG. 3 with its wedge ends 51 located in their "up" position within the upper portions of the notches 52 in the head 3. The cross arm 60 is slidably mounted on the pivot shafts 22 in order to permit the free rotation of the said shafts in the carrier slide 12, and it is held in proper fixed position on the shafts against sliding movement therealong by tie bars 62 fastened at their opposite ends to the cross arm 60 and the carrier slide 12.

As soon as the elevator mechanism 10 reaches its lowered position, the suction cups 19, 20 are connected to the vacuum source, by the opening of the vacuum supply control valve 43 by cam 44. The resulting pull of the vacuum in the suction cups 19, 20 then draws the reflector sections 1 in the head 3 back against the cupped ends 39 of the suction cups, as a result of which the reflector sections 1 then close off the cupped ends of the suction cups and the vacuum ports 40 therein. The resulting build-up of the vacuum in the chambers 33 of the air cylinders 31 then acts to retract the pistons 30 thereof, against the compressive force of the springs 37, until the rubber-faced support plates 32 for the suction cups 19, 20 butt against the body portions 36 of the air cylinders. The reflector sections 1 are thereby withdrawn completely out of the wells 5 in the head 3, against the inward holding force of the leaf springs 7, so as to be clear of the heads 3 for the subsequent upward movement of the elevator mechanism 10.

With the reflector sections 1 thus held by the suction cups 19, 20 in positions removed from the wells 5 in the head 3, the elevator mechanism 10 is then elevated by the operation of the air cylinder 15 through the actuation of the control valve 17 therefor by the cam 18. During the last part or upper portion of the upward movement of the elevator mechanism 10, the pivot shafts 22 are rotated, to swing the suction cups 19, 20 and the associated reflector sections 1 downwardly and outwardly to a face down position as shown in FIG. 5, by the engagement of the rollers 27 on the lever arms 25 with the stationary plate cam 28. The suction cups 19, 20 and the associated reflector sections 1 held therein are then maintained in such face down position at the raised position of the elevator mechanism 10 by the continued engagement of the rollers 27 on lever arms 25 with the vertical side cam surfaces 64 (FIG. 5) of the plate cam 28.

When the elevator mechanism 10 reaches its raised position, the horizontally reciprocable carriage 11 is then moved to its extended position in which it underlies the two face down reflector sections 1 held in the suction cups 19, 20 of the raised elevator mechanism, as shown in FIG. 5, so as to receive and support the reflector sections thereon in such face down position on subsequent interruption of the vacuum connection to the suction cups and resulting dropping of the reflector sections therefrom. On its ensuing return movement to its retracted position as shown in dash-dot lines in FIG. 5, the carriage 11 then carries the two reflector sections 1 completely out from beneath the elevated suction cups 19, 20 of the elevator mechanism so as to be clear thereof for subsequent unobstructed downward movement of the elevator mechanism at the beginning of the next cycle of operation thereof. During the course of its return stroke, the carriage 11 carries the reflector sections 1 onto the upper run 65 of a continuously moving horizontal conveyor belt 66 which is mounted outwardly adjacent the turret 2 and extends in a direction aligned with the head 3 positioned at the unloading station 0 and with the two reflector sections 1 held by the suction cups 19, 20 of the elevator mechanism 10 when in its raised position. The conveyor belt 66 rides around a motor driven pulley wheel 67 at one end thereof and around an idler pulley 68 at its other end. The pulley wheels 67 and 68 are located at the opposite ends of and are rotatably mounted on a horizontally elongated supporting framework comprised of a pair of horizontally extending parallel channel irons 69 and 70 (FIG. 6) resting on and fastened to a horizontal bed plate 71 which is supported on a pair of upstanding support posts 72 and 73 resting on the machine bed or on the floor.

The horizontally reciprocable carriage 11 is in the form of a U-shaped member comprised of a pair of generally horizontally extending parallel side plate or arm portions 75 which are disposed on either side of the channel irons 69, 70 so as to straddle them and are joined at one end (i.e., at the rearward end thereof nearest the elevator mechanism 10) by a web portion 76. As shown in FIG. 6, the side arm portions 75 of the carriage 11 are spaced apart a distance slightly less than the diameter of the peripheral rim portions of the reflector sections 1 so as to permit the reflector sections to rest, at opposite sides of their peripheral rim portions, on the spaced arms 75 of the carriage. The upper edges of the spaced arm portions 75 on which the reflector sections 1 rest are located a slight distance below the upper surface of the upper run 65 of the conveyor belt 66, as clearly shown in FIG. 6. As a consequence, the reflector sections 1 ride up onto, and are picked up and lifted off the side arm portions 75 by the upper run 65 of the conveyor belt 66 as the reflector sections are advanced thereagainst by the carriage 11 on its return stroke, thereby effecting the transfer of the reflector sections from the carriage onto the upper run of the conveyor belt.

The carriage 11 is mounted for horizontal reciprocating movement on the horizontal guide or bed plate 71 by means of cooperating sets of support rollers 77, 78 on the carriage engaging with the top and bottom surfaces, respectively, of the guide plate 71, and cooperating sets of lateral guide rollers 79 on the carriage engaging with the opposite side edges of the guide plate 71. The horizontal reciprocating movement of the carriage 11 is imparted thereto by a pair of air cylinders 80, 81 integrally joined together as a unit in side-by-side relation and the respective piston rods 82 and 83 of which extend in opposite directions therefrom and are respectively connected to a bracket 84 on the stationary frame or channel iron member 69 and to a bracket 85 on the carriage 11. The integrally joined air cylinders 80, 81 are supported in place for horizontal reciprocating movement, when the cylinders are operated, by means of a pair of support arms 86 fastened thereto and each carrying a support roller 87 resting on the upper side of a guide or support track 88 for rolling movement therealong and a guide roller 89 received within a channelway 90 in the support track for rolling movement therewithin. The support track 88 is supported at its opposite ends on the support posts 72 and 73. The operation of the air cylinders 80, 81 is controlled by a conventional four-way control valve 91 (FIG. 7) which is actuated by a cam 92 on the cam shaft 8. In its two alternative operating positions as determined by the cam 92, the control valve 91 is adapted to supply compressed air to one or the other corresponding sides of the pistons in the air cylinders 80, 81 while simultaneously venting the other sides thereof.

Upon being carried onto the conveyor belt 66 by the carriage 11, the reflector sections 1 are then advanced by the conveyor belt to its forward end where they are discharged into a chute 93 down which the reflector sections then slide and come to rest against an upstanding retaining lip 94 at the bottom end of the chute where the reflector sections are then inspected for flaws such as pinholes, for example, in the reflecting coating. The inspection of the reflector sections 1 is accomplished by directing a beam of light, from an electric lamp 95 mounted beneath the chute 93, through an opening 96 in the floor of the chute and against the concave under side of the reflector section 1 resting against the retaining lip 94 on the chute, and visually examining the convex upper side of the reflector section for the appearance of any light penetrating the reflecting coating thereon such as denotes the presence of a void or pin-hole in the reflecting coating. The operator performing the visual examination manually rotates the reflector section 1 about its axis, while it rests on the floor of the chute, so as to successively position the annular extent of the reflector section directly over the lamp 95, thereby permitting more effective visual examination of the reflecting coating on the reflector section.

To prevent the reflector sections 1 from piling up against the one located in the inspection position at the bottom of the chute 93 and thus interfering with the manual rotation thereof by the operator during the inspection operation, suitable escapement means 97 (FIG. 5) are provided for holding back the second one of the two reflector sections 1 discharged into the chute by the carriage 11 and conveyor belt 66, on each cycle of operation of the elevator mechanism 10, until the first reflector section 1 has been fully inspected and removed from the chute by the inspecting operator. As shown in FIG. 5, the escapement means 97 comprises a spaced pair of bell crank levers 98 which are unitarily joined together and are freely pivoted beneath the chute 93 on a support bracket 99 fastened to the support post 72 and supporting the chute. The upwardly extending arms 100 of the bell crank levers 98 project through respective slots 101 in the floor of the chute for engagement by the rim of each reflector section 1, as they slide down the chute, to thereby pivot the bell crank levers. The other arms 102 of the bell crank levers 98 are pivotally connected to the lower ends of a pair of substantially vertically extending reflector stop pins 103 which, when the bell crank levers 98 have been swung to their operative position as shown in FIG. 5 by a reflector section 1 located at the bottom of the chute, project through respective openings 104 in the floor of the chute and a slight distance thereabove so as to engage with the rim of the succeeding reflector section, as it slides down the chute, to thereby restrain it from further sliding movement. As soon as the lowermost reflector section 1 in the chute 93 is removed therefrom by the inspecting operator, the stop pins 103 automatically move down of their own weight (simultaneously pivoting the bell crank levers 98) so as to withdraw their upper ends below the floor of the chute, thereby allowing the reflector section 1 previously restrained by the stop pins to then slide down further to the bottom of the chute in readiness for the inspection thereof. During such downward sliding movement of the reflector section 1, it engages the upper ends of the arms 100 of bell crank levers 98 to pivot them to their operative position to cause the stop pins 103 to be elevated so as to once again project above the floor of the chute. During such pivotal swinging movement of the bell crank levers 98 by the sliding reflector section 1, the upwardly extending arm 100 of one of the levers engages with the operating button or plunger 105 of a control switch 106 mounted on the bracket 99 to thereby close the electrical circuit to the inspection lamp 95 so as to light it.

What we claim as new and desire to secure by Letters Patent of the United States is:

1. Apparatus for unloading a pair of cup-shaped articles from a supporting head normally holding the articles in opposed relation with their concave sides facing horizontally toward one another, said apparatus comprising article elevator means mounted adjacent said head for vertical reciprocating movement between a lowered article pick-up position and a raised article-releasing position, operating means for vertically reciprocating said elevator means, said elevator means including suction cup means pivotally mounted thereon for vertical swinging movement between a horizontally facing article pick-up position and a downwardly facing article-releasing position, suction cup pivoting means operative to locate the suction cup means in their said horizontally facing pivoted position at the lowered position of said elevator means and in their said downwardly facing pivoted position at the raised position of said elevator means, article carriage means mounted adjacent said head for horizontal reciprocating movement between a retracted position displaced to one side of said elevator means and an advanced article-receiving position directly underlying said suction cup means when in their said downwardly facing raised position, actuating means for horizontally reciprocating said carriage means, and means for effecting the operation of the said operating and actuating means in proper time relation and for continuously connecting said suction cup means to a source of vacuum supply from the time the elevator means is in its said lowered position until it is in its said raised position.

2. Apparatus for unloading a pair of cup-shaped articles from a supporting head normally holding the articles in opposed relation with their concave sides facing horizontally toward one another, said apparatus comprising article elevator means mounted adjacent said head for vertical reciprocating movement between a lowered article pick-up position and a raised article-releasing position, operating means for vertically reciprocating said elevator means, said elevator means including suction cup means pivotally mounted thereon for vertical swinging movement between a horizontally facing article pick-up position and a downwardly facing article-releasing position, suction cup pivoting means operative to locate the suction cup means in their said horizontally facing pivoted position at the lowered position of said elevator means and in their said downwardly facing pivoted position at the raised position of said elevator means, a flat conveyor belt located to one side of said head and extending horizontally in a direction aligned with said head, means comprising a drive pulley for continuously moving said conveyor belt to cause its upper run to travel in a direction away from said head, article carriage means mounted adjacent said head for horizontal reciprocating movement between an advanced article-receiving position directly underlying said suction cup means when in their said downwardly facing raised position and a retracted position overlapping the said conveyor belt to thereby carry the pair of articles released by said suction cup means successively onto the upper run of said conveyor belt at the near end thereof, actuating means for horizontally reciprocating said carriage means, and means for effecting the operation of the said operating and actuating means in proper time relation and for continuously connecting said suction cup means to a source of vacuum supply from the time the elevator means is in its said lowered position until it is in its said raised position.

3. Apparatus for unloading a pair of cupped glass reflectors provided with opaque reflecting coatings from a supporting head normally holding the reflectors in opposed relation with their concave sides facing horizontally toward one another, said apparatus comprising vertically reciprocable reflector elevator means provided with suction cup means for grasping the reflectors and withdrawing them from said head and carrying them to an elevated face down position with their concave sides facing downwardly, means for continuously connecting said suction cup means to a source of vacuum from the time the elevator means is in its lowered position until it is in its said raised position, a horizontally extending flat conveyor belt located adjacent and extending away from said elevator means, means comprising a drive pulley for continuously moving said conveyor belt to cause its upper run to travel in a direction away from said elevator means, horizontally reciprocable carriage means for receiving the reflectors upon release thereof from said suction cup means when in their elevated position and transporting the reflectors in their said face down position onto the near end of the upper run of said conveyor belt, actuating means for horizontally reciprocating said carriage means in proper time relation to the dwell of said elevator means at its raised position, and reflector inspecting means comprising a downwardly inclined chute at the far end of said conveyor belt onto which the reflectors are delivered by said belt, escapement means controlling the sliding movement of said reflectors down said chute to release them one at a time to an inspection position at the bottom end of the chute, and a light source located beneath and visible through said chute at said inspection position to illuminate the underside of the reflectors at said position and thereby provide a visible indication of the presence of pin holes in the reflecting coating thereof.

4. Apparatus for unloading a pair of cup-shaped articles from a supporting head normally holding the articles in opposed relation with their concave sides facing horizontally toward one another and their peripheral rim portions seated against annular seat portions of the head, said apparatus comprising elevator means mounted adjacent said head for vertical reciprocating movement between a lowered article pick-up position and a raised article-releasing position, operating means for vertically reciprocating said elevator means, movable wedge means mounted adjacent said head and operative to pry the rim portions of said articles loose from the said seat portions of said head, said elevator means engaging with and operating said wedge means during the downward stroke of the elevator means, suction cup means mounted on said elevator means for grasping the articles in said head, and means for continuously connecting said suction cup means to a source of vacuum supply from the time the elevator means is in its said lowered position until it is in its said raised position.

5. Apparatus for unloading a pair of cup-shaped articles from a supporting head normally holding the articles in opposed relation with their concave sides facing horizontally toward one another and their peripheral rim portions seated against annular seat portions of the head, said apparatus comprising elevator means mounted adjacent sid head for vertical reciprocating movement between a lowered article pick-up position and a raised article-releasing position, operating means for vertically reciprocating said elevator means, article loosening means comprising a pair of lever arms pivotally mounted on said head and having wedge ends insertable between the rims of the respective articles and the said annular seat portions of the head on pivotal movement of the lever arms to thereby pry the articles loose from the said seat portions, said elevator means engaging with and pivoting said lever arms during the downward stroke of the elevator means to thereby cause the said wedge ends of the lever to pry the articles loose from said seat portions, suction cup means pivotally mounted on said elevator means for vertical swinging movement between a horizontally facing article pick-up position and a downwardly facing article-releasing position, suction cup pivoting means operative to locate the suction cup means in their said horizontally facing pivoted position at the lowered position of said elevator means and in their said downwardly facing pivoted position at the raised position of said elevator means, and means for continuously connecting said suction cup means to a source of vacuum supply from the time the elevator means is in its said lowered position until it is in its said raised position.

6. Apparatus for unloading a pair of cup-shaped articles from a supporting head normally holding the articles in opposed relation with their concave sides facing horizontally toward one another, said apparatus comprising article elevator means mounted adjacent said head for vertical reciprocting movement between a lowered article pick-up position and a raised article-releasing position, operating means for vertically reciprocating said elevator means, said elevator means including suction cup means pivotally mounted thereon for vertical swinging movement between a horizontally facing article pick-up position and a downwardly facing article-releasing position, suction cup pivoting means comprising spring means normally urging said suction cup means to their said horizontally facing pivoted position and operating lever arms engageable with stationary cam means during the upper portion of the vertical travel of said elevator means to swing the suction cup means to and maintain them in their said downwardly facing pivoted position at the raised position of said elevator means, and means including a control valve operated in timed relation to said operating means for continuously connecting said suction cup means to a source of vacuum supply from the time the elevator means is in its said lowered position until it reaches its said raised position.

7. Apparatus for unloading a pair of cup-shaped articles from a supporting head normally holding the articles in opposed relation with their concave sides facing horizontally toward one another, said apparatus comprising article elevator means mounted adjacent said head for vertical reciprocating movement between a lowered article pick-up position and a raised article-releasing position, said elevator means including vertically extending supporting guide means, a carrier slide vertically slidable on said supporting guide means, a pair of spaced horizontal side-by-side pivot shafts journaled in said carrier slide and projecting therefrom in a direction to straddle the article-carrying sides of said head when the elevator means is in its said lowered position, and suction cup means carried by the projecting ends of said pivot shafts and adapted to engage and grasp the said articles in said heads, operating means for vertically reciprocating said elevator means, spring means normally urging said pivot shafts to a rotative position in which the said suction cup means are located in opposed horizontally facing article pick-up position, means comprising lever arms fixed on said pivot shafts and a stationary cam engageable with said lever arms during the upper portion of the vertical travel of said elevator means to rotate said shafts so as to swing the said suction cup means and associated articles to and maintain them in a downwardly facing article-releasing position at the raised position of said elevator means, and means including a control valve for continuously connecting said suction cup means to a source of vacuum supply from the time the elevator means is in its said lowered position until it reaches its said raised position.

8. In combination, a horizontal carrier having a plurality of heads thereon each adapted to support a pair of cup-shaped articles in opposed relation with their concave sides facing horizontally toward one another, means comprising a cam shaft and a cam thereon for intermittently indexing said carrier to advance said heads successively to a plurality of work stations including an unloading station, article elevator means mounted adjacent said unloading station for vertical reciprocating movement between a lowered article pick-up position and a raised article-releasing position, operating means controlled by said cam shaft for vertically reciprocating said elevator means in proper time relation to the index movement of said carrier, suction cup means pivotally mounted on said elevator means for vertical swinging movement between a horizontally facing article pick-up position and a downwardly facing article-releasing position, suction cup pivoting means comprising spring means normally urging said suction cup means to their said horiozntally facing pivoted position and operating lever arms engageable with stationary cam means during the upper portion of the vertical travel of said elevator means to swing the suction cup means to and maintain them in their said downwardly facing pivoted position at the raised position of said elevator means, and means including a control valve actuated by said cam shaft for continuously connecting said suction cup means to a source of vacuum supply from the time the elevator means is in its said lowered position until it reaches its said raised position.

9. In combination with apparatus as specified in claim 8, an article carriage means mounted adjacent said unloading station for horizontal reciprocating movement between a retracted position displaced to one side of both said elevator means and said carrier and an advanced article-receiving position underlying said suction cup means when in their said downwardly-facing raised position, and actuating means controlled by said cam shaft for horizontally reciprocating said carriage means in proper time relation to the dwell of said elevator means at its said raised position.

10. In combination, a horizontal carrier having a plurality of heads thereon each adapted to support a pair of cup-shaped articles in opopsed relation with their concave sides facing horizontally toward one another and their peripheral rim portions seated against annular seat portions of the head, means comprising a cam shaft and a cam thereon for intermittently indexing said carrier to advance said heads successively to a plurality of work stations including an unloading station, each of said heads being provided with movable wedge means mounted thereon and operative to pry the rim portions of the articles loose from the said seat portions of the respective head, article elevator means mounted adjacent said unloading station for vertical reciprocating movement between a lowered article pick-up position and a raised article-releasing position, operating means controlled by said cam shaft for vertically reciprocating said elevator means in proper time relation to the index movement of said carrier, said elevator means engaging on its downward stroke with the said wedge means of each head when positioned at said unloading station to thereby operate the wedge means, suction cup means mounted on said elevator means for grasping the articles in said heads, and means including a control valve actuated by said cam shaft for continuously connecting said suction cup means to a source of vacuum supply from the time the elevator means is in its said lowered position until it reaches its said raised position.

References Cited in the file of this patent

UNITED STATES PATENTS

| | | |
|---|---|---|
| 1,792,576 | Dryon | Feb. 17, 1931 |
| 2,304,859 | Strickland | Dec. 15, 1942 |
| 2,790,536 | Reed | Apr. 30, 1957 |